March 5, 1940.    V. C. SMITH    2,192,510
AUTOMATIC MOVABLE GATE FOR DAMS
Filed July 3, 1939    10 Sheets-Sheet 1

Inventor
V. C. SMITH
By Malcolm F. Gannott
Attorney

March 5, 1940.  V. C. SMITH  2,192,510
AUTOMATIC MOVABLE GATE FOR DAMS
Filed July 3, 1939  10 Sheets-Sheet 2

Inventor
V. C. SMITH
By
Malcolm F. Gannett
Attorney

March 5, 1940.  V. C. SMITH  2,192,510
AUTOMATIC MOVABLE GATE FOR DAMS
Filed July 3, 1939    10 Sheets-Sheet 4

Inventor
V. C. SMITH
By Malcolm F. Gannett
Attorney

March 5, 1940.　　　V. C. SMITH　　　2,192,510
AUTOMATIC MOVABLE GATE FOR DAMS
Filed July 3, 1939　　　10 Sheets-Sheet 7

Inventor
V. C. SMITH
By
Malcolm F. Gannett
Attorney

March 5, 1940.  V. C. SMITH  2,192,510
AUTOMATIC MOVABLE GATE FOR DAMS
Filed July 3, 1939  10 Sheets-Sheet 8
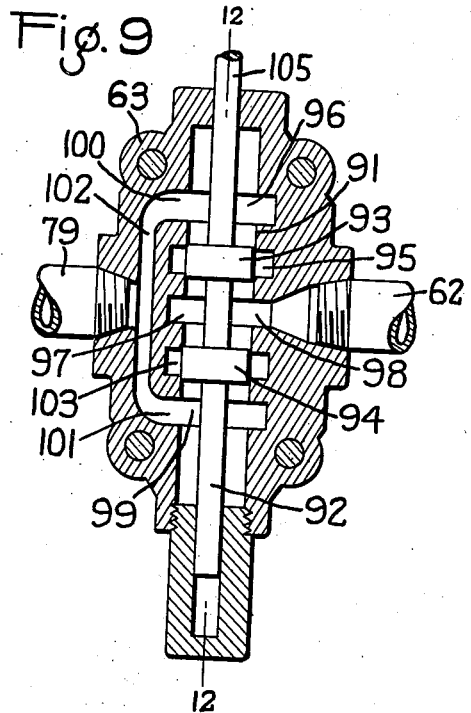
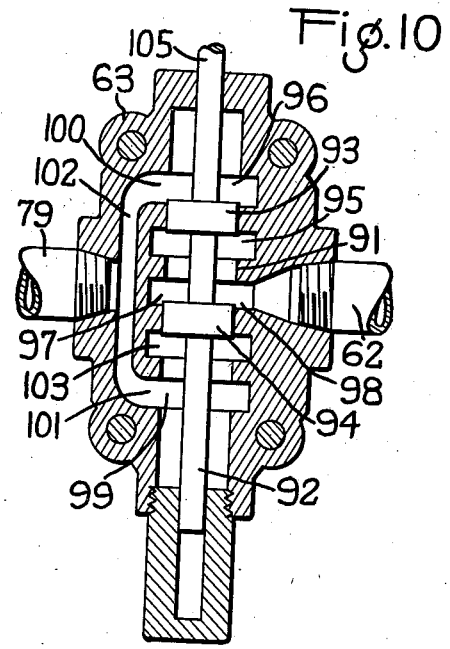
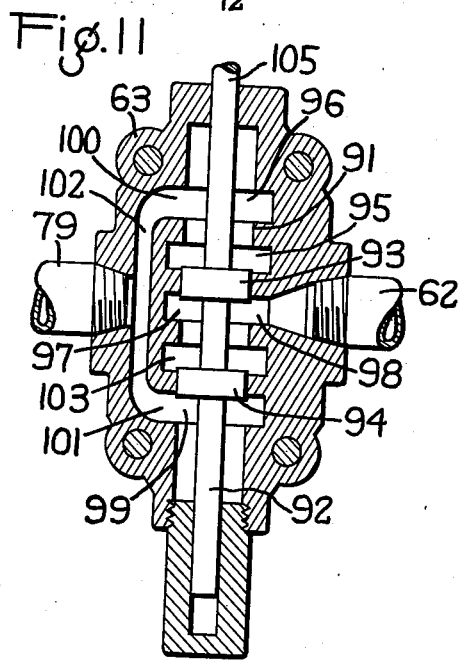
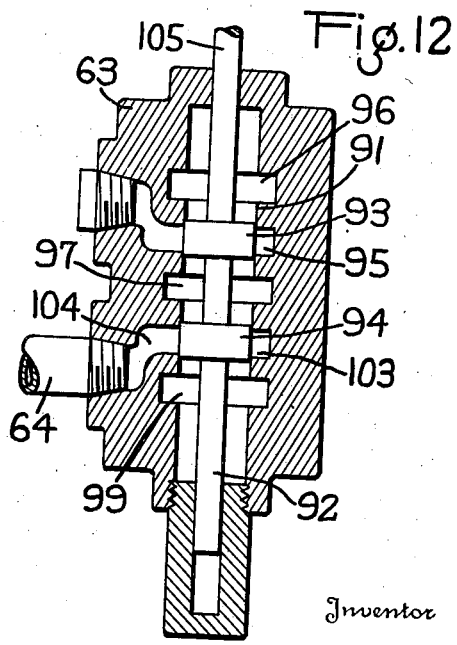
Inventor
V. C. SMITH
By Malcolm F. Bannett
Attorney March 5, 1940.  V. C. SMITH  2,192,510
AUTOMATIC MOVABLE GATE FOR DAMS
Filed July 3, 1939    10 Sheets-Sheet 9
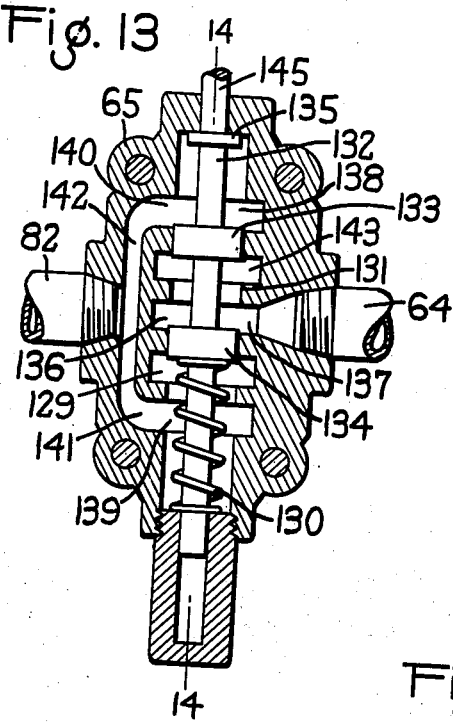
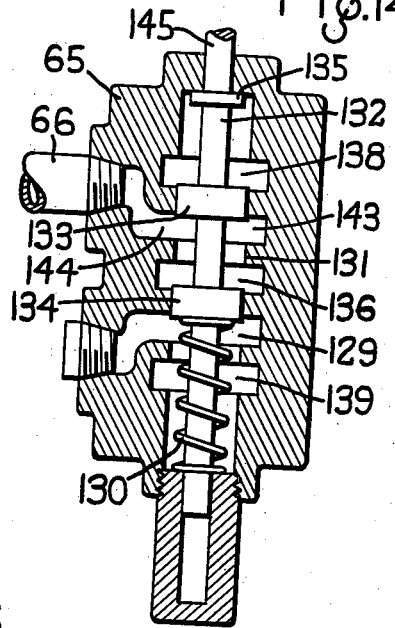
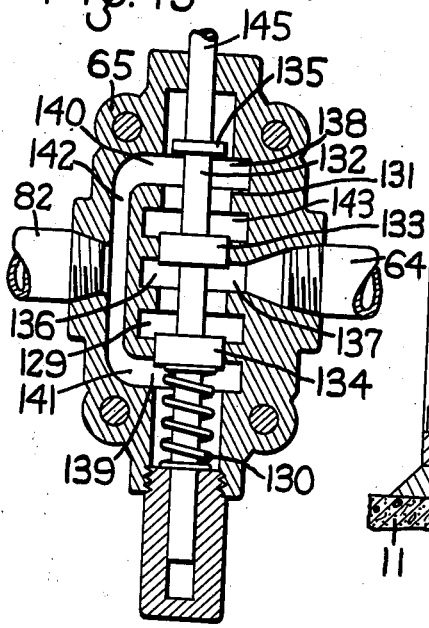
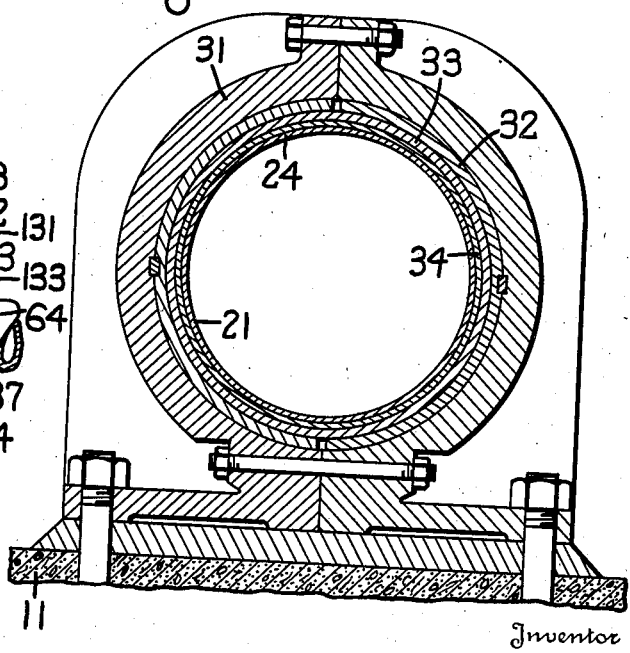
Inventor
V. C. SMITH
By Malcolm F. Gannett
Attorney March 5, 1940.  V. C. SMITH  2,192,510
AUTOMATIC MOVABLE GATE FOR DAMS
Filed July 3, 1939  10 Sheets-Sheet 10
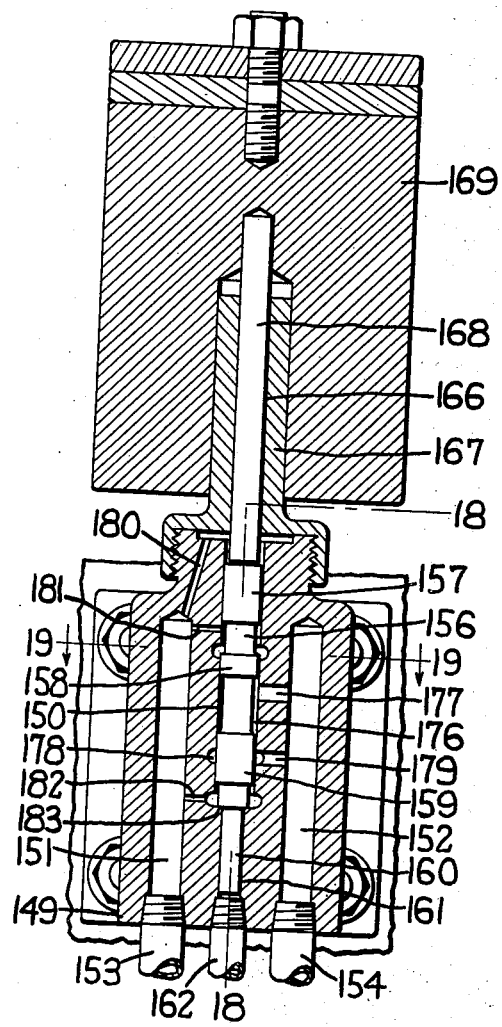
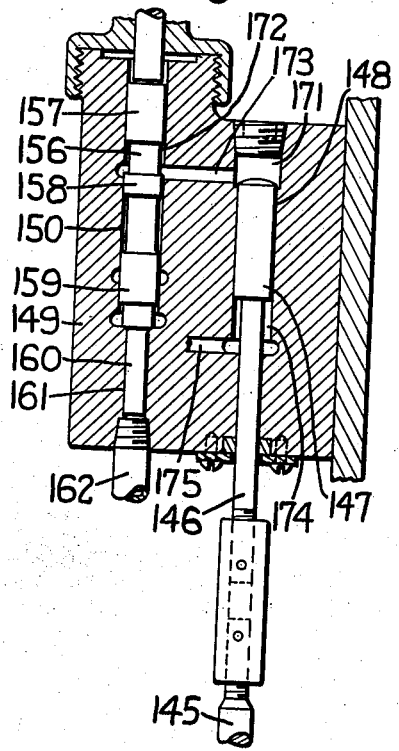
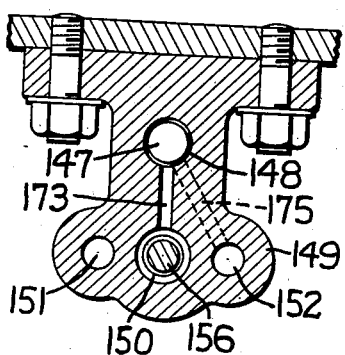
Inventor
V. C. SMITH
By Malcolm F. Garnett
Attorney Patented Mar. 5, 1940

2,192,510

UNITED STATES PATENT OFFICE 2,192,510

AUTOMATIC MOVABLE GATE FOR DAMS

Verl Chester Smith, York, Pa., assignor to S. Morgan Smith Company, York, Pa., a corporation of Pennsylvania Application July 3, 1939, Serial No. 282,695

15 Claims. (Cl. 61—22)

This invention relates to dams and other hydraulic structures for damming water in streams, and more particularly to movable structures or water gates mounted on the crests of dams.

An object of the invention is to provide an improved movable gate structure adapted to be automatically operated so as to maintain a substantially uniform predetermined amount of head water at the upstream side of the dam.

Another object of the invention is to provide an improved operating mechanism for movable dam structures which is controlled by means actuated by variations in the level of the head water.

To the accomplishment of the foregoing and related ends, the invention, then, comprises the features hereinafter fully described, and particularly pointed out in the claims, the following description and the annexed drawings setting forth in detail an illustrative embodiment of the invention, this being indicative, however, of but one of the various ways in which the principle of the invention may be employed.

In the accompanying drawings:

Fig. 9 is a vertical longitudinal section of one of the control valves shown in Fig. 3, the valve being shown in neutral position;

Fig. 10 is a vertical section view of the control valve shown in Fig. 9, showing the same in gate lowering position;

Fig. 11 is a view similar to Fig. 10 showing the valve in gate raising position;

Fig. 12 is a vertical transverse section taken on the line 12—12 of Fig. 9;

Fig. 13 is a vertical longitudinal section of the other control valve shown in Fig. 3, the parts being shown in normal position in which communication through the valve is maintained to supply the operating cylinders with fluid under pressure;

Fig. 14 is a vertical transverse section taken on the line 14—14 of Fig. 13;

Fig. 15 is a view similar to Fig. 13 showing the valve in the position in which fluid is exhausted from the operating cylinders of the apparatus;

Fig. 16 is a vertical transverse section of one of the gate bearings taken on the line 16—16 of Fig. 1;

Fig. 17 is a vertical section of the unloader valve device shown in Fig. 3;

Fig. 18 is a vertical section taken on the line 18—18 of Fig. 17; and

Fig. 19 is a horizontal section taken on the line 19—19 of Fig. 17.

Figure 1:
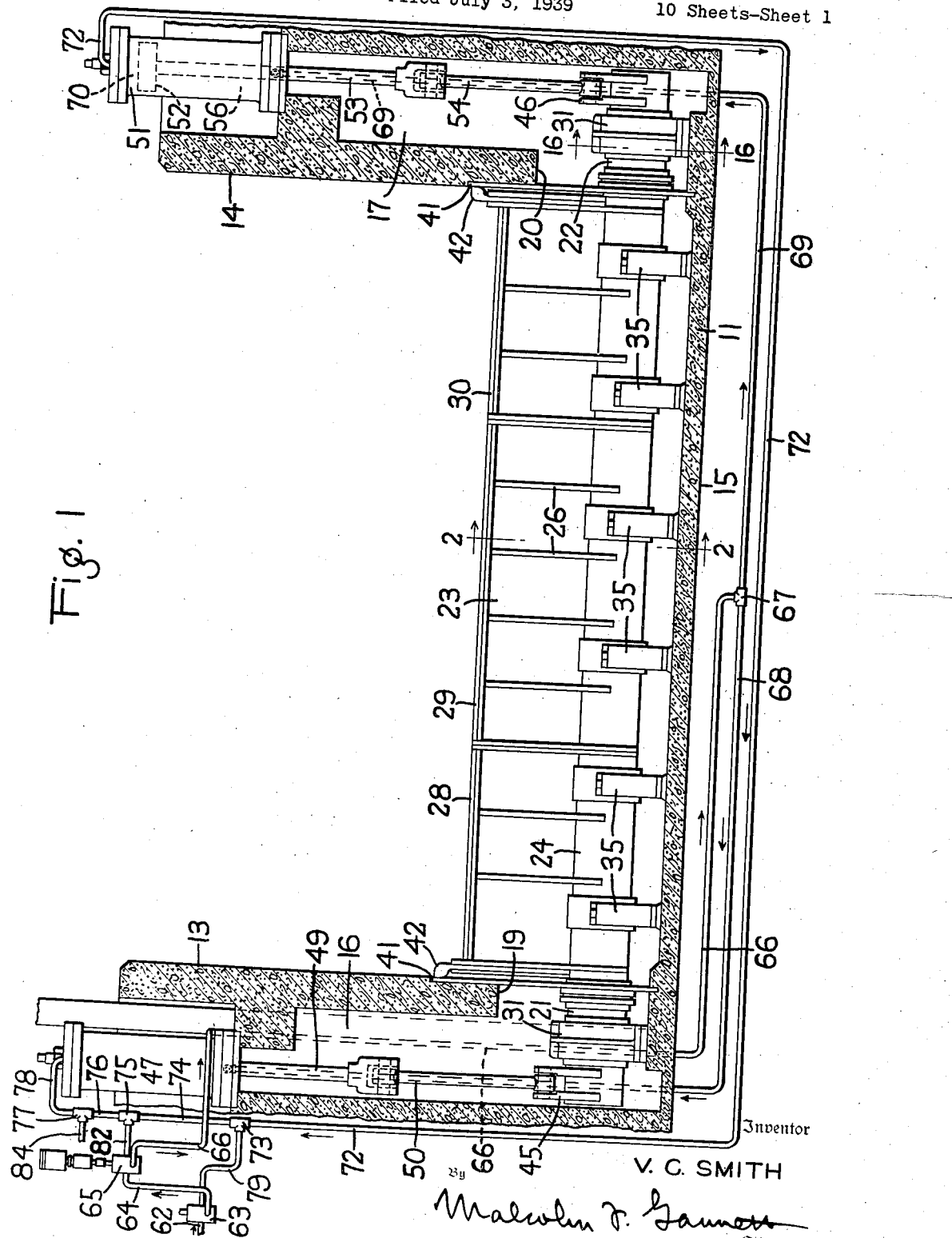
Figure 1 is a vertical longitudinal section of the crest of a dam showing the movable gate and operating mechanism therefor of the present invention mounted thereon.
Figure 2:
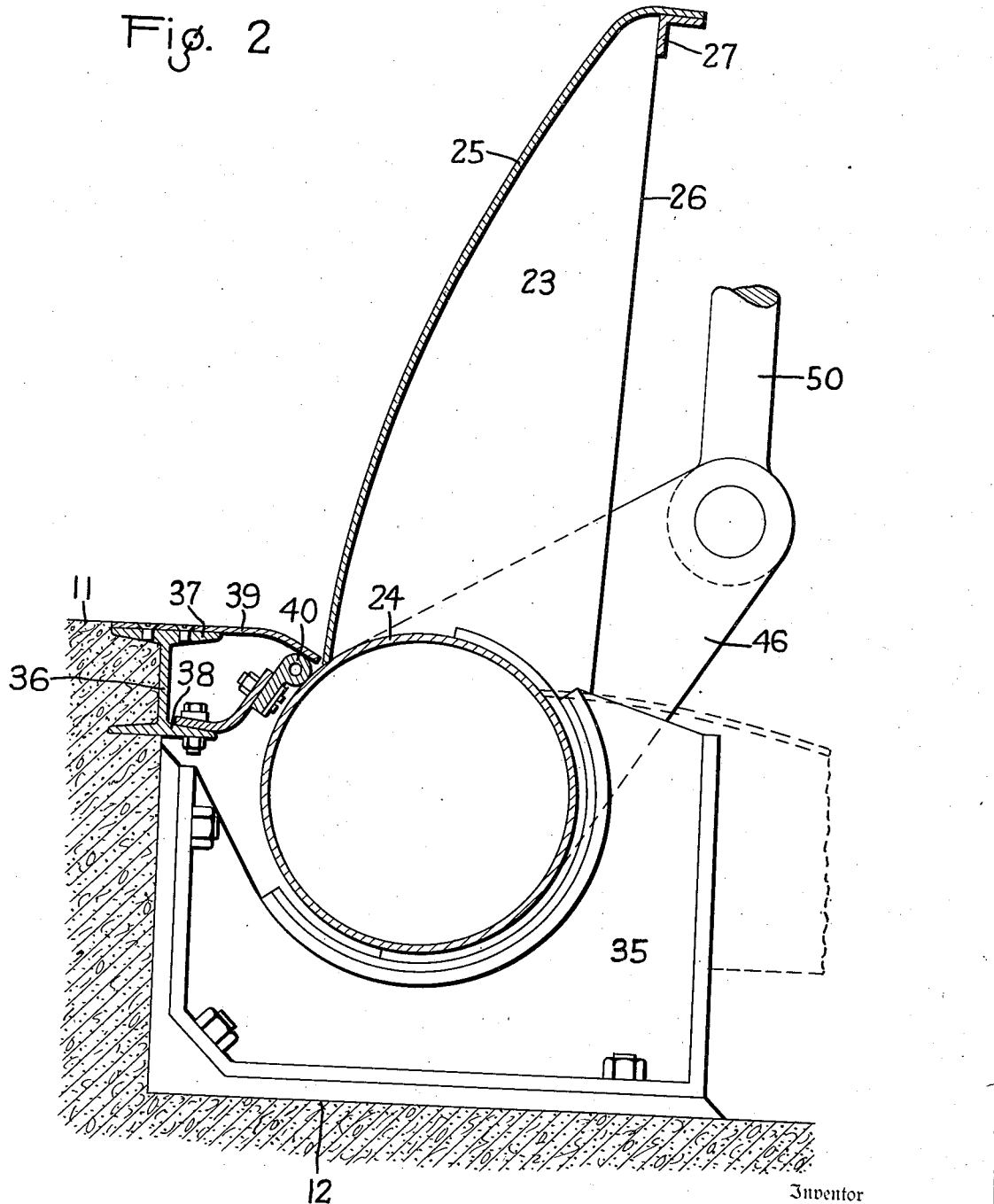
Fig. 2 is a vertical transverse section taken on the line 2—2 of Fig. 1.

Referring to the drawings, the main portion 11 of the dam which extends across the stream may be of any height with respect to the bed of the stream and has a sill 12 formed in its upper portion or crest (see Figs. 1 and 2).

At each end of the crest of the dam there are upstanding end walls, one of which is indicated at 13 and the other being designated 14.

When the width of the stream is considerable and more than one gate is required for damming up the water, the intermediate end walls may be in the form of piers.

A tunnel 15 is formed longitudinally in the dam in proximity to the sill 12. The pier or end wall 13 has a vertical chamber 16 formed therein and the pier or end wall 14 has a vertical chamber 17 formed therein. The tunnel and said chambers provide means in the dam structure for accommodating operating and control mechanism of the apparatus.

The end walls 13 and 14, respectively, have openings 19 and 20 formed therein for the ends 21 and 22, respectively, of a rotatable member or gate 23, which is adapted to maintain the head water at a predetermined level.

The gate 23 comprises a cylindrical body portion 24 and an arcuate shield 25 which extends outwardly from the cylinder 24 and is held rigid therewith by means of a plurality of plates 26. The plates 26 are disposed transversely with respect to the longitudinal axis of the gate. An angle iron 27 may also be provided along the outer edge of the shield 25. Preferably the gate is constructed of sheet metal, such as plate steel. The cylinder 24 should be of sufficient diameter and strength to render the same proof against distortion. The gate structure provides a flap gate in which the flap is rigidly connected to the cylinder 24.

Water gates of the type herein shown and described may be constructed of any length, and in some instances the gates have a length of one hundred feet and more. When the gates are constructed of such length it is necessary to construct the parts thereof in short sections which can be easily assembled, and to join the several sections together in the field to form a unitary structure.

In the present instance the gate 23 is shown as being composed of three sections 28, 29 and 30. The plates 26 are so disposed that at the adjoining ends of the sections the plates abut, as shown in Fig. 1, and these abutting plates are adapted to be secured face to face together by bolts, rivets or the like fastening elements.

The ends 21 and 22 of the gate are carried by suitable bearings 31, one of which is shown in detail in Fig. 16.

Each bearing 31 is anchored to the dam structure 11 and has a bushing 32 which engages a sleeve 33 mounted on each end of the cylinder, a shim 34 being interposed between the sleeve and the cylinder so as to permit alinement of the cylinder in the bearings when the device is being assembled.

Between the main bearings 31, the gate is supported on a plurality of bearings 35 (see Figs. 1 and 2), which are mounted on the sill 12. The bearings 35 are semi-circular in form, being open at the top and permit free turning movements of the gate structure.

Mounted in the top of the dam structure 11 and coextensive therewith between the end walls or piers 13 and 14, is an I-beam 36 having upper and lower horizontal flanges 37 and 38, respectively, which flanges extend downstream with respect to the crest of the dam and overlie the sill 12.

The upper flange 37 of the I-beam 36 supports a horizontally disposed plate 39 which extends downstream from the crest of the dam structure 11 to a point adjacent to the junction of the shield 25 with the cylinder 24 when the gate 23 is in raised position, as shown in Fig. 2.

The plate 39 overlies a flexible sealing strip 40 carried by the lower flange 38 of the I-beam 36 and serves as means for protecting said sealing strip from debris floating down the stream.

The sealing strip 40 is coextensive with the cylinder 24 and makes a rubbing contact with said cylinder at all times and irrespective of the position of the gate shield 25 so as to prevent leakage of water beneath the bottom portion of the gate.

The walls of the piers 13 and 14 are formed with armature plates 41 against which bear sealing means 42 carried by end shields at each end of the gate 23, as shown in Fig. 1.

The extremity of the cylinder 24 which is disposed in the chamber 16 carries a crank 45 and the extremity of said cylinder which is disposed in the chamber 17 carries a crank 46 (see Figs. 1 and 2).

Figure 3:
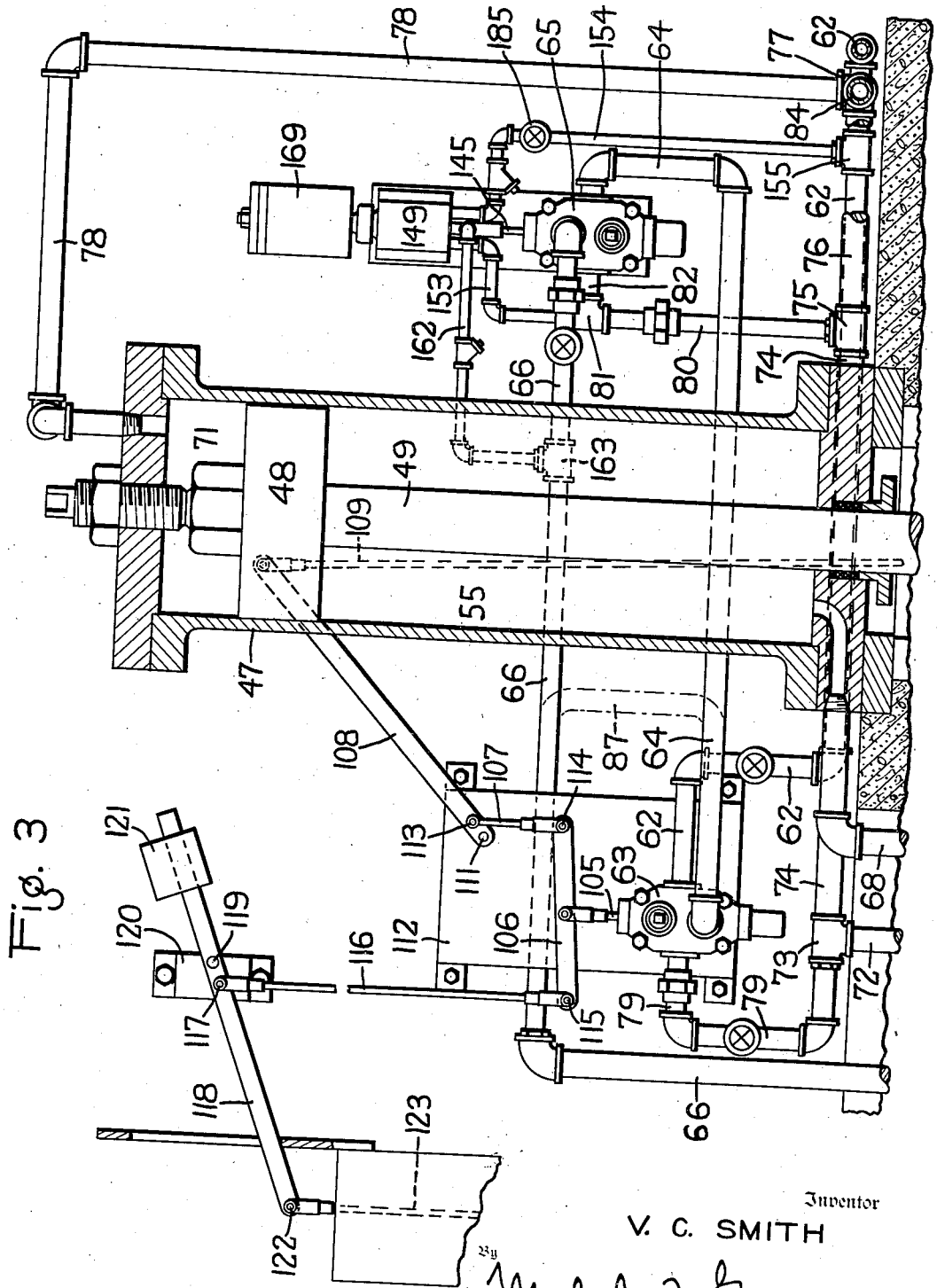
Fig. 3 is an enlarged elevation, partly in section, of the operating mechanism and control means therefor at one end of the dam.
Figure 5:
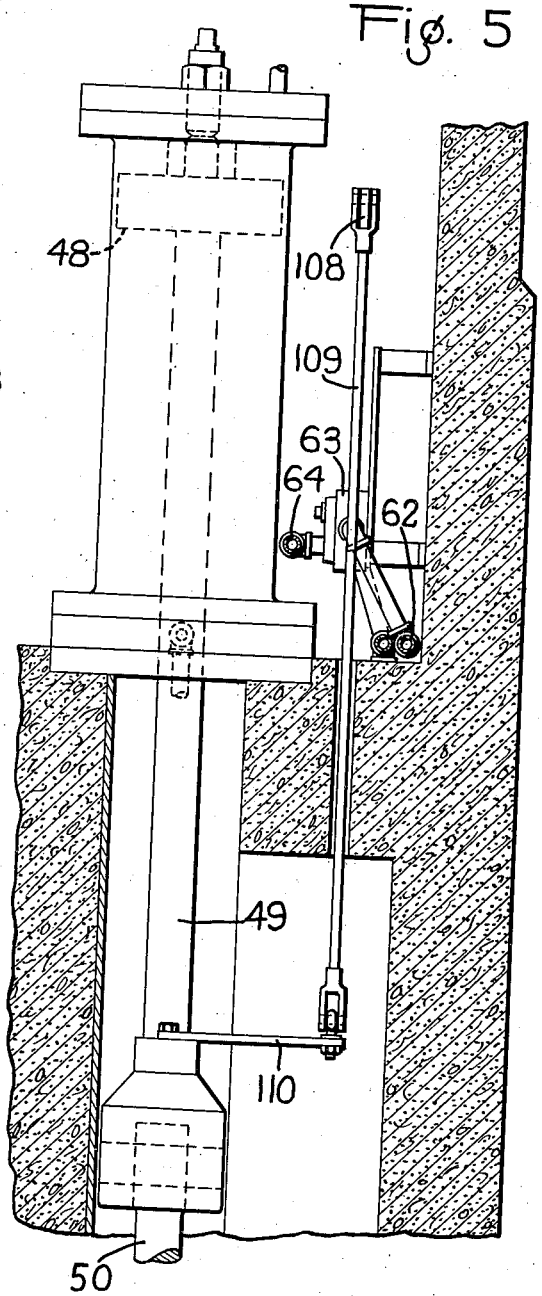
Fig. 5 is an elevation, partly in section, showing the relation of the control means to one of the operating cylinders.

Mounted in the pier 13 and disposed above the chamber 16, is a cylinder 47, in which is mounted a piston 48 having a rod 49 which is connected to the crank 45 by a link 50 (see Figs. 1, 3 and 5).

Mounted in the pier 14 and disposed above the chamber 17, is a cylinder 51 which is similar in construction to the cylinder 47 and in which is mounted a piston 52 having a rod 53 which is connected to the crank 46 by a link 54 (see Fig. 1).

When the gate 23 is in raised position the pistons 48 and 52 are disposed in the upper portions of the cylinders 47 and 51, respectively, and are retained in such position by fluid under pressure supplied to the chambers 55 and 56 beneath said pistons, respectively, in the manner to be hereinafter more fully described.

Fluid under pressure from a fluid pressure tank 61 (see Figs. 7 and 8) is delivered through a pipe line 62, control valve 63, pipe line 64, and control valve 65, to a pipe line 66 which extends down into the tunnel 15 (see Figs. 1, 3 and 5). The end of the pipe 66 in the tunnel is connected by a T connection 67 to two pipes 68 and 69. The pipe 68 leads to the chamber 55 of the power cylinder 47, and the pipe 69 is connected to the chamber 56 of the power cylinder 51. This arrangement of the parts is such that both chambers 55 and 56 are supplied with fluid under substantially the same pressure.

The chamber 70 of the cylinder 51 is connected to the chamber 71 of the cylinder 47, by pipe 72, T connection 73, pipe 74, T connection 75, pipe 76, T connection 77, and pipe 78.

The T connection 73 is connected to the control valve 63 by a pipe 79 (see Fig. 3).

The T connection 75 is connected to the control valve 65 by a pipe 80, T connection 81, and pipe 82.

Figure 7:
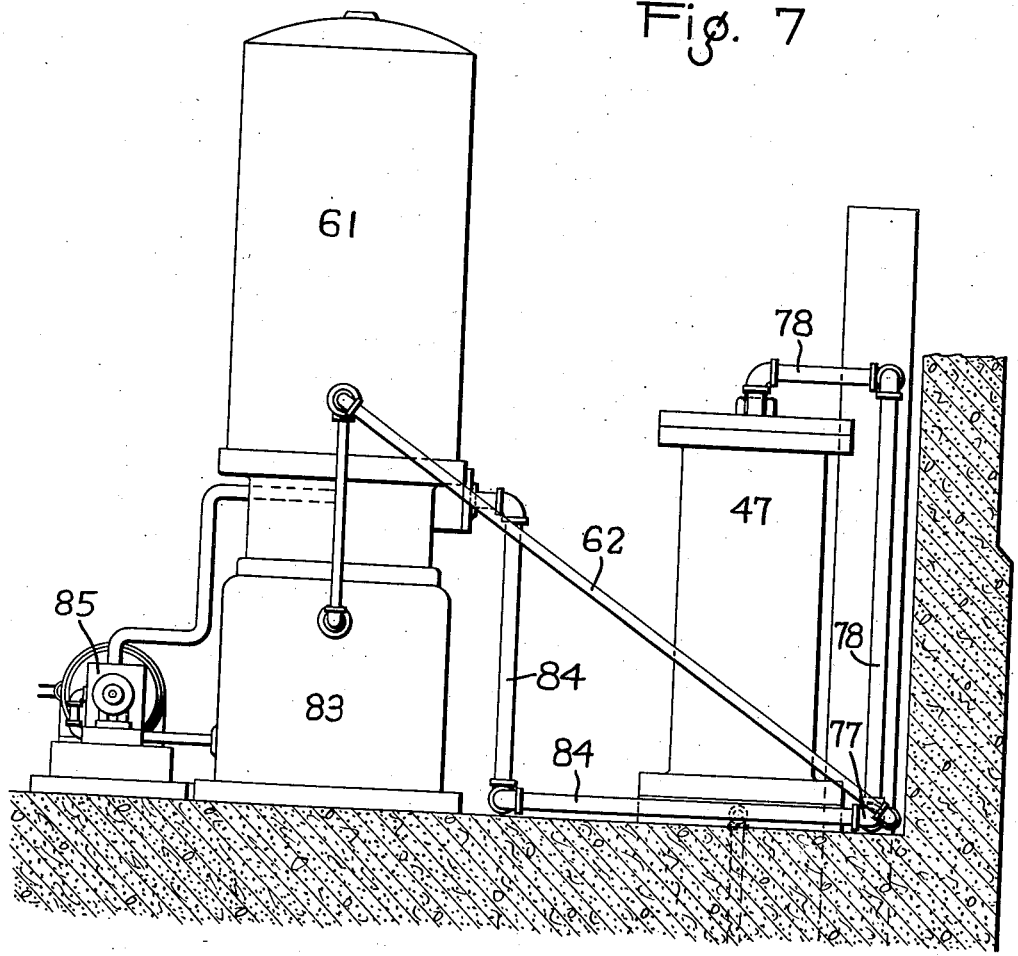
Fig. 7 is an elevation of the means for supplying fluid under pressure to the operating mechanism, the dam structure being shown in vertical section.
Figure 8:
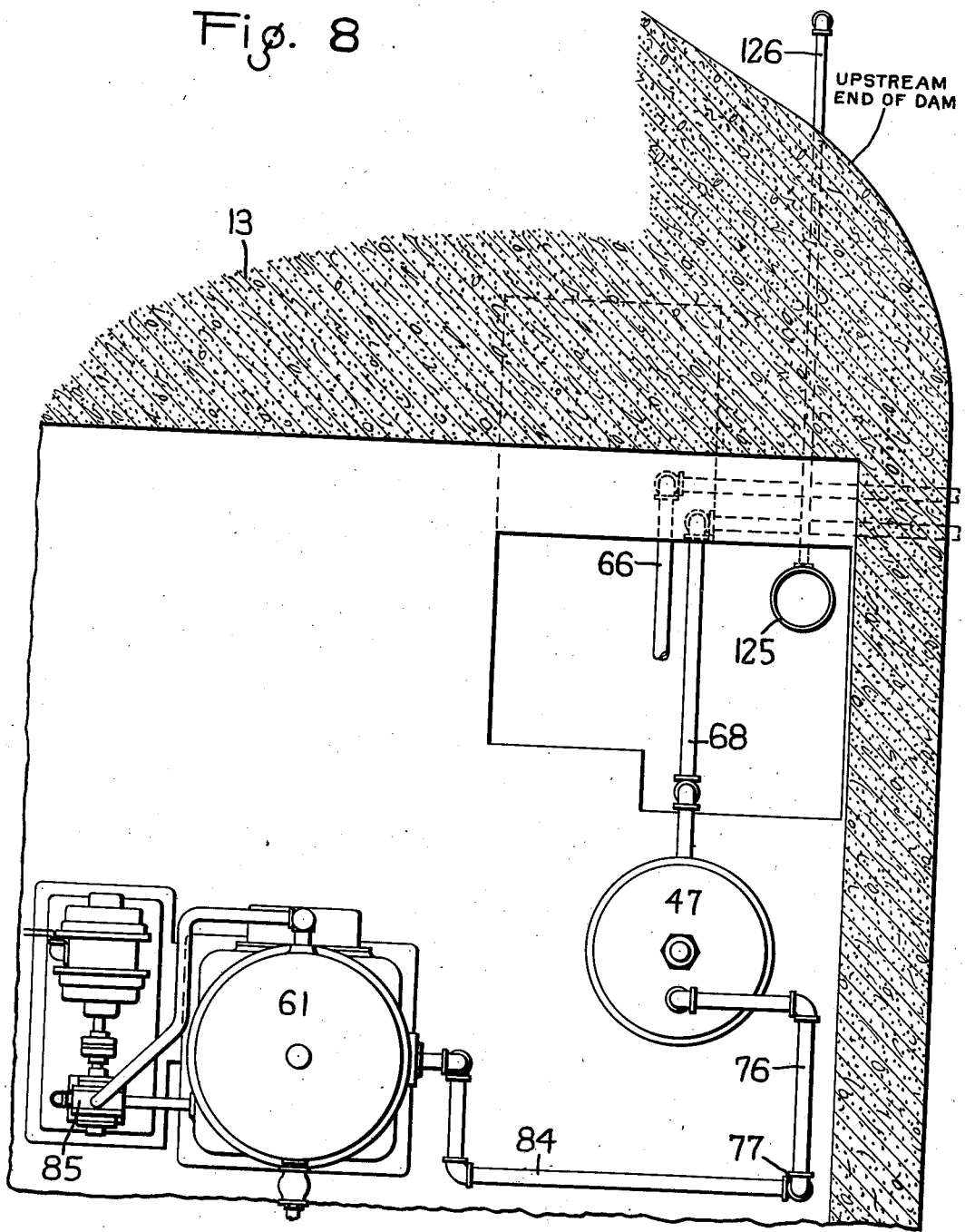
Fig. 8 is a plan of the structure shown in Fig. 7, the dam structure being shown in horizontal section.

The T connection 77 is connected to a sump tank 83 by a pipe 84 (see Figs. 3, 7 and 8).

Fluid under pressure is adapted to be transferred from the sump tank 83 to the tank 61 by an electric motor driven pump 85, as shown in Figs. 7 and 8. In the present instance oil is used as the fluid, and the pump 85 is adapted to be automatically controlled in well known manner so as to maintain the pressure of the oil in the tank 61 of a predetermined amount at all times.

As shown in Figs. 9, 10, 11 and 12, the control valve 63 comprises a casing formed with a cylindrical bore 91 in which is mounted a plunger 92 formed with spaced heads 93 and 94.

Chamber 97 of the control valve 63 is connected to the fluid pressure pipe 62, by a port 98.

The chambers 96 and 99 of the control valve 63 are connected to the pipe 79, by ports 100 and 101, respectively, and a passage 102.

The chamber 103 of the control valve 63 is connected to the pipe 64, by a port 104, and the chamber 95 is blank.

As shown in Figs. 9 and 12, when the plunger 92 is in neutral position, such as the position in which the gate 23 is held raised, as shown in Figs. 1 and 2, fluid under pressure delivered to the cylinders 5 and 56 through pipes 66, 68 and 69 (Fig. 1) is bottled up, since the port 104 is lapped by plunger head 94, thereby cutting off communication from the control valve 63 to pipe 64.

At the same time, fluid under pressure from the tank 61 which is delivered to the control valve 63, through pipe 62, is bottled up in chamber 97 by the plunger heads 93 and 94.

The plunger 92 has a stem 105, the upper end of which is pivotally connected to the intermediate portion of a floating lever 106, as shown in Fig. 3.

One end of the floating lever 106 is connected to the piston rod 49, by a link 107, lever 108, link 109, and rod 110.

The lever 108 has one end pivotally connected, as at 111, to a support 112, and the connection of the link 107 with the lever 108 is adjacent to the pivot 111, as indicated at 113. The pivotal connection of the link 107 with the lever 106 is indicated at 114.

The arm 110 is rigidly fixed to the piston rod 49 and extends laterally therefrom so that when the piston rod moves downwardly and upwardly the arm 110 will be carried therewith and through the connection of the arm 110 with link 109 the levers 106 and 108 will be operated, the lever 108 moving about the fixed pivot 111 and the lever 106 moving about movable pivots, as will be hereinafter more fully described.

The end of the floating lever 106 opposite to the end having the pivot 114, is pivotally connected, as at 115, to the lower end of a link 116.

The upper end of the link 116 is pivotally connected, as at 117 to a lever 118.

The lever 118, adjacent to the pivot 117 is pivotally connected, as at 119, to a support 120.

The lever 118 extends beyond the pivot 119 and carries a weight 121.

Figure 4:
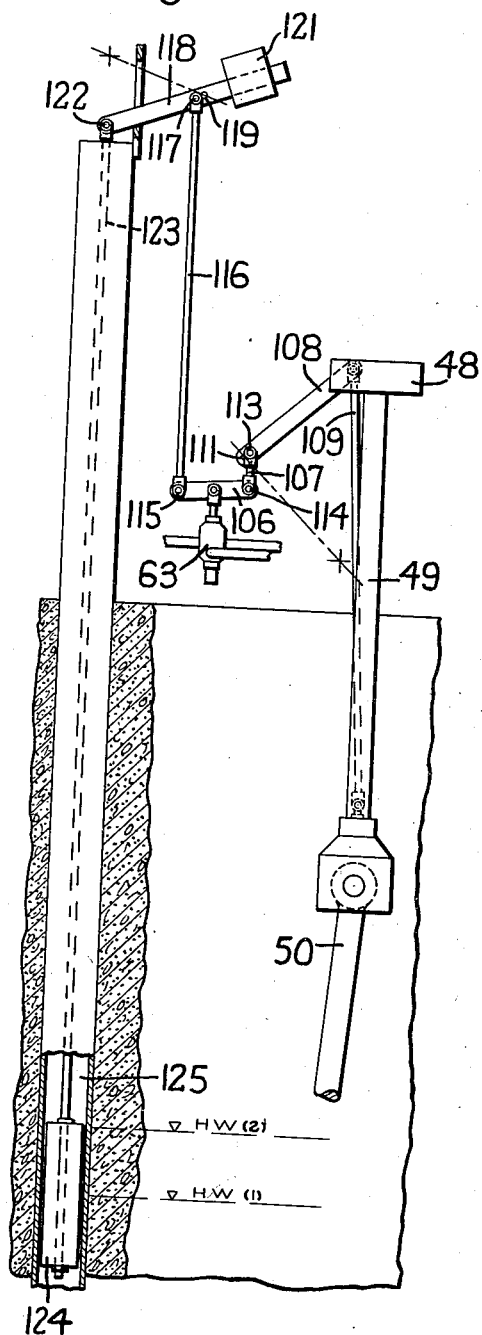
Fig. 4 is a diagrammatic view, partly in section, of a portion of the control means.
Figure 6:
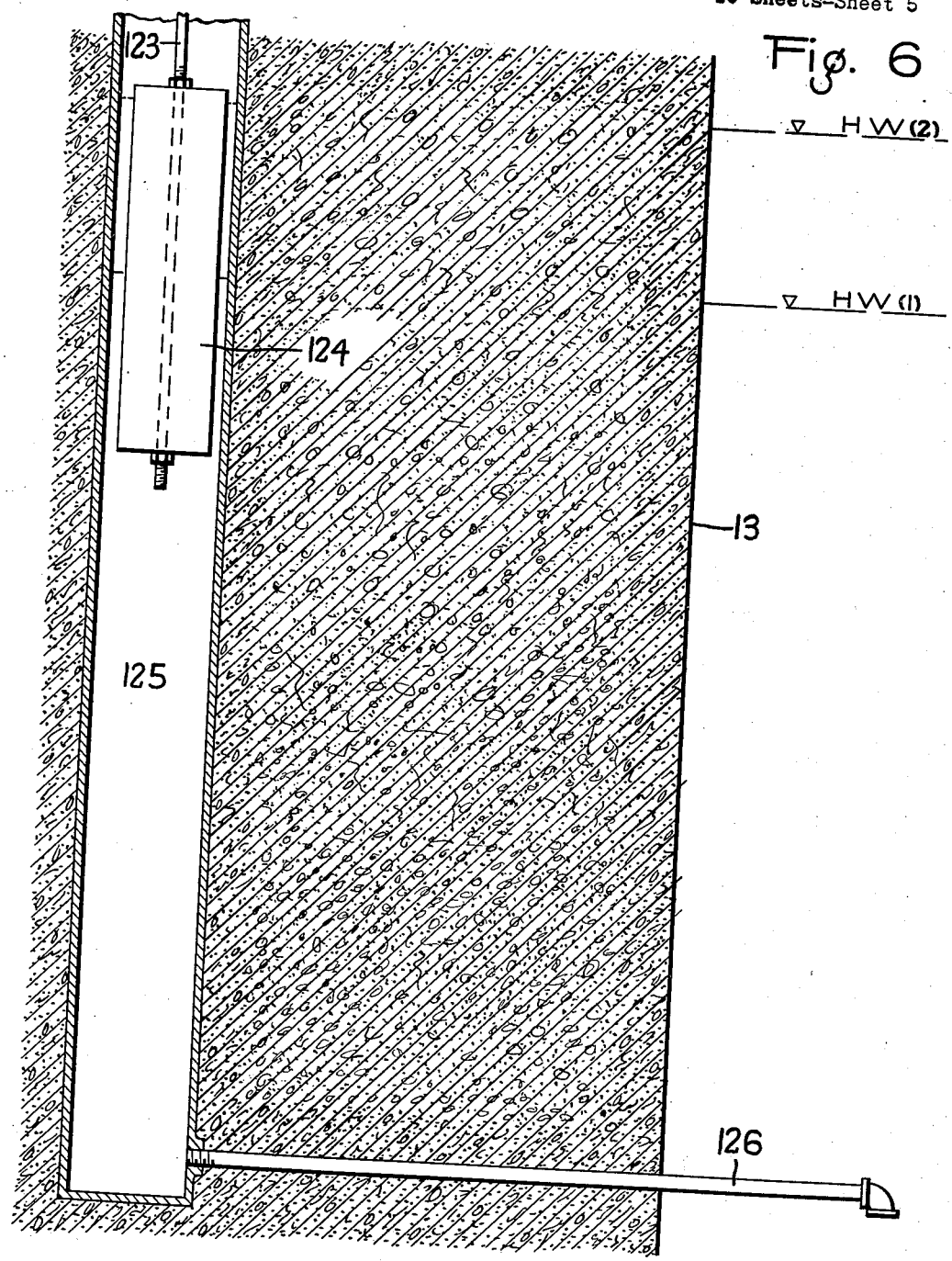
Fig. 6 is a vertical section of a portion of the dam structure showing the well for the float of the control means.

The end of the lever 118 opposite to the end having the weight 121 is pivotally connected, as at 122, to the rod 123 of a float 124 (see Figs. 3, 4 and 6).

The floating lever 106 and its operating means constitutes compensating mechanism to prevent over traveling of the gate 23, as will be hereinafter more fully described.

The end wall or pier 13 is formed with a vertically disposed well 125 in which the float 124 is disposed (see Figs. 6 and 8).

The well 125 extends from the upper portion of the end wall or pier 13 downwardly to a point where the float 124 can be located in water from the pool on the upstream side of the dam 11, and in order that water from such pool can be supplied to the well, the bottom portion of said well is connected to the pool by means of a pipe 126 (see Figs. 6 and 8).

The construction of the float 124, the well 125 and the pipe 126 is such that the float is supported by the water in the well at a predetermined height and the level of the water in the well is maintained at the same level as the level of the water in the pool on the upstream side of the dam, so that when the level of water in the pool changes, a corresponding change will be effected in the level of the water in the well, such fluctuations in water level being effective in initiating operation of the gate mechanism by actuating the control valve 63 in the manner to be hereinafter described.

As shown in Figs. 13, 14 and 15, the control valve 65 comprises a casing formed with a cylindrical bore 131, in which is mounted a plunger 132 formed with spaced heads 133 and 134.

The upward movement of the plunger 132 in the bore 131 is limited by a collar 135 carried by said plunger and adapted to contact the upper end of the bore 131, as shown in Figs. 13 and 14.

The plunger 132 is urged upwardly by an expansible coil spring 130 encircling the stem of said plunger and bearing at one end against the underside of the head 134 and at the other end against the bottom of the bore 131.

The chamber 136 of the control valve 65 is connected to the pipe 64 by a port 137.

The chambers 138 and 139 of the control valve 65 are connected to the pipe 82, by ports 140 and 141, respectively, and passage 142.

The chamber 143 is connected to the pipe 66, by a port 144, and the chamber 129 is blank, as shown in Fig. 14.

As shown in Figs. 13 and 14, when the plunger 132 is in normal or raised position, the chambers 136 and 143 are connected so that communication is maintained through the control valve 65 between pipes 64 and 66.

At the same time chambers 138 and 139 are connected to the sump tank 83, through passage 142, and pipes 82, 76 and 84 (see Figs. 1 and 13).

The plunger 132 has a stem 145 (Figs. 3 and 18) which is connected to the stem 146 of a piston 147 disposed in a bore 148 of an unloader valve device 149.

In addition to the bore 148, the unloader valve 149 is also formed with bores 150, 151 and 152 (see Figs. 17 and 19).

The bore 151 constitutes a chamber which is connected to the T connection 81 heretofore referred to by a pipe 153 (see Fig. 3).

The bore 152 constitutes a chamber which is connected to the pressure line pipe 62 by a pipe 154 and a T connection 155.

Mounted in the bore 150 is a plunger 156 formed with spaced heads 157, 158 and 159 which fit fairly snugly within said bore.

Below the head 159, the plunger 156 is formed with a reduced downwardly extending portion 160 which is mounted in a bore 161.

The bore 161 extends downwardly to the bottom of the unloader valve casing where it is connected to one end of a pipe 162. The other end of the pipe 162 is connected to the pipe 66, as indicated at 163 (Fig. 3), so that fluid under pressure in the pipe 66 is conducted to the bore 161 and acts on the bottom of the portion 160 of the plunger 156.

Slidably mounted in a bore 166 of a tubular supporting member 167 mounted on top of the casing of the unloader valve device 149, is a rod 168 which supports a plurality of weights 169. As shown in Fig. 17 the weights 169 are of varying sizes to enable the desired amount of weight to be mounted on the rod 168. These weights function as a counterweight in the manner to be hereinafter more fully described.

The chamber 171 on one side of the piston 147 is connected to the chamber 172 by a passage 173.

The chamber 174 on the other side of the piston 147 is connected to the chamber 152, by a passage 175.

The chamber 152 is connected to the chamber 176 by a passage 177, and the chamber 152 is also connected to a chamber 178, by a passage 179.

Since the chamber 151 is connected to the sump tank 83 through the pipe 153, said chamber functions as means for draining surplus operating fluid from the unloader valve device 149. Accordingly, the chamber 151 is connected to several portions of the bore 150 by passages 180, 181 and 182.

Beneath the head 159 of the plunger 156 and at the junction of the lower portion of the bore 150 with the bore 161 there is a shoulder 183 against which the plunger 156 rests under normal operating conditions of the apparatus. When the plunger 156 is in such position (see Fig. 17) fluid under pressure delivered to the unloader valve 149 through pipe 162 and flowing past the portion 160 of the plunger, the fluid will be delivered to the chamber 151 through passage 182. From the chamber 151 the fluid will be returned to the sump tank.

Fluid under pressure delivered to the chamber 152 by the pipe 154 will be bottled up in chamber 152 since the plunger heads 158 and 159 cut off chamber 176 and passage 177, and the passage 179 is lapped by the plunger head 159.

As shown in Figs. 4 and 6, the desired level of head water to be maintained at the upstream side of the dam is indicated at HW (1) and HW (2). When the level of the water is at HW (1) the water will be approximately at the top of the gate 23 (see Fig. 2). The point HW (2) indicates a point above the top of the gate 23 at which the maximum desired amount of water will flow over the gate. In Fig. 4 the float 124 and the leverage mechanism connected thereto are shown in the position in which it is assumed that the level of the head water is between the points indicated at HW (1) and HW (2). Should the level of the head water be below the point indicated at HW (1), the mechanism will not function, since it is desired to retain the gate 23 in upright position so that water flowing down stream will be dammed up.

When the level of the head water increases above the point indicated at HW (2), the float 124 will rise in the float well 125 an amount sufficient to effect operation of the control mechanism of the apparatus and the lever 118 will be swung upwardly about its fixed pivot 119.

This upward movement of the lever 118 results in the link 116 being pulled upwardly and consequently the floating lever 106 will be moved about the pivot 114.

When the floating lever 106 is moved upwardly about the pivot 114, the plunger 92 of the control valve 63 is pulled upwardly from the neutral position shown in Fig. 9 to the position shown in Fig. 10.

When the plunger 92 is thus actuated the plunger head 94 is moved upwardly thereby establishing communication between chambers 99 and 103 of the control valve 63.

The piston chambers 55 and 56 will now be connected to the sump tank 83, through pipes 68 and 69, respectively, pipe 66, control valve 65, which remains inactive, pipe 64, chambers 103 and 99, port 101, passage 102, and pipes 79, 74, 76 and 84 (see Figs. 1, 3, 7 and 10).

Fluid under pressure in the chambers 55 and 56 which acts against the underside of the pistons 48 and 52 now flows to the sump tank, and the gate 23 commences to swing downwardly and rearwardly towards the dotted line position indicated in Fig. 2, due to the pressure of the water acting against the upstream side of the gate.

When the gate 23 thus moves downwardly the pistons 48 and 52 will move downwardly in the cylinders 47 and 51, respectively.

This downward movement of the pistons 48 and 52 results in the lever 108 being moved downwardly about its fixed pivot 111, thereby causing the end of the floating lever 106 having the pivot 114 to be moved downwardly, said lever 106 swinging about the fulcrum provided by the pivot 115. In this way the control valve plunger 92 is returned to the position in which communication between chambers 99 and 103 is cut off, and over traveling of the gate is prevented.

The fluid under pressure supplied to the chamber 97 by pipe 62 will be bottled up in said chamber during the above described operation of the control valve 63, and when the plunger 92 is thus returned to neutral position, the fluid under pressure in piston chambers 55 and 56 will act on the pistons 48 and 52, respectively, so that the gate 23 is held in a lower position than the position shown in Fig. 2, which position of the gate permits sufficient water to flow over the dam to reduce the level of the head water.

When the level of the head water has thus been decreased to a point corresponding substantially to the point indicated at HW (1), Fig. 4, the downward movement of the float effects downward movement of the plunger 92 of the control valve 63 so that the chamber 103 is connected to the chamber 97, as shown in Fig. 11.

In this position of the control valve 63 fluid under pressure from the pressure tank 61 is supplied to the cylinders 55 and 56, in the manner previously described, and the pistons 48 and 52 will be raised, thereby raising the gate 23 to the position whereby the head water will be at the desired level.

In actual practice it has been found that the level of the head water will vary between the point indicated at HW (1) and HW (2), Fig. 4, without effecting operation of the control valve 63 in the manner heretofore described. In other words, slight variations in the level of the head water will not be effective to cause operation of the control mechanism. This is advantageous, since it is only desired to lower or raise the gate 23 when appreciable variations occur in the level of the head water. Accordingly, the leverage mechanism which is connected to the stem 105 of the plunger 92 is adapted to be moved by the float through a range or distance substantially the distance shown in Fig. 4 between HW (1) and HW (2) before the control valve plunger 92 is moved an amount sufficient to effect operation of the apparatus in the manner heretofore described.

During the normal operation of the apparatus fluid under pressure supplied to the piston chambers 55 and 56 is also supplied to the bottom portion 160 of the plunger 156 of the unloader valve device 149, through pipe 162 (see Figs. 3 and 17). However, since the weights 169 acting on the plunger 156 retain the plunger in down position against the shoulder 183, said plunger will remain in such position until the pressure of the operating fluid increases an amount sufficient so that the fluid supplied through pipe 162 to the bottom of the plunger overcomes the downward pressure of the weights.

Under normal conditions the pressure of the fluid in the cylinders 55 and 56 acting against the underside of the pistons 48 and 52, respectively, is sufficient to retain the gate 23 raised.

When the pressure against the upstream face of the gate 23 becomes excessive, due to heavy formations of ice, accumulation of logs, debris, and other foreign matter in the pool, and other causes, this increase in pressure will be transmitted through the cranks 45 and 46 to the pistons 48 and 52, respectively, so that the pressure of the fluid in the chambers 55 and 56 is increased. This increase in fluid pressure is effective to raise the plunger 156 of the unloader valve device 149.

The upward movement of the plunger 156 moves the head 158 upwardly an amount sufficient to connect passage 177 with passage 173, thereby permiting fluid under pressure which is supplied to the chamber 152 by pipe 154, to flow into chamber 171.

The increase in pressure of fluid in chamber 171 acting against the top of the piston 147, causes said piston to move downwardly, thereby moving the plunger 132 of the control valve 65 downwardly from the position shown in Fig. 13 to the position shown in Fig. 15, in which latter position communication through the control valve 65 from pipe 64 to pipe 66 is cut off and pipe 66 is connected to the sump tank 83, through port 144, chambers 143 and 138, port 140, passage 142, and pipes 82, 76 and 84 (see Figs. 1 and 3).

The cylinders 55 and 56 are now connected to the sump tank 83, through the control valve 65, and the apparatus operates in the manner heretofore described to lower the gate 23.

When the plunger 156 of the unloader valve 149 has been moved upwardly in the manner heretofore described the plunger head 159 will uncover passage 179 so that fluid under pressure is admitted to the chamber 178 on the underside of the plunger head 159. In this way the plunger 156 is maintained in raised position.

The gate 23 will, in this way, be lowered completely and rest on the sill of the dam 11.

When it is desired to restore the operating mechanism to an active condition so that the gate 23 can be raised, valve 185 (Fig. 3) is operated to cut off communication through the pipe 154 so as to relieve the pressure of the fluid acting against the plunger 156. When the valve 185 is closed, fluid will drain through passage 182 into chamber 151 and from thence the fluid will flow back to the sump tank 83.

Upon the reduction of fluid pressure acting on the plunger 156 the weights 169 will move the plunger 156 downwardly to the position shown in Fig. 15. In this way the fluid under pressure in chamber 171 acting on the top of the piston 147 is reduced, since chamber 171 is also connected to the drain chamber 151, through passage 173, chamber 172 and passage 181. The spring 130, acting against the plunger 132 then returns the control valve 65 to the normal position shown in Fig. 13.

Since the float 124 will be down below the position shown in Fig. 4, the plunger 92 of the control valve 63 will also be in the position in which fluid under pressure from pipe 62 is supplied through chambers 97 and 103 to the pipe 64, from which pipe the fluid under pressure is delivered to the piston chambers 55 and 56 so that the pistons 48 and 52 are moved upwardly, thereby returning the gate to the raised or upright position shown in Figs. 1 and 2.

Since the control valve 65, the unloader valve 149, and the parts operatively associated therewith are adapted to function only under extraordinary pressure conditions, as has been heretofore described, when installations of the apparatus are made where such extraordinary pressure conditions may not exist, these elements may be dispensed with. In such case the pipes 64 and 66 may be connected as shown by the pipe indicated by dotted lines 87 in Fig. 3.

The control valve 63 will function in the manner heretofore described to control communication of the fluid pressure lines to the power cylinders 47 and 51 so that the gate 23 will be lowered when the head water level exceeds a predetermined amount.

Having thus described my invention, what I claim is:

1. In a dam, the combination of a rotatably mounted gate for maintaining the head water at a predetermined level, a crank arm extending laterally from each end of the gate, a power piston in a cylinder at each end of the gate, means connecting each piston with each crank arm, respectively, a source of supply of fluid under pressure, a pipe line connecting both power cylinders, a valve for controlling the fluid under pressure from said source to said pipe line and adapted to maintain fluid bottled up in the pipe line when the gate is in normal position, a float operated by the head water, a floating lever operatively connected to said valve, means operatively connecting said float with said floating lever, and means connecting said floating lever with said means connecting a piston with a crank arm.

2. In a dam, the combination of a rotatably mounted gate for maintaining the head water at a predetermined level, a crank arm extending laterally from each end of the gate, a power piston in a cylinder at each end of the gate, means connecting each piston with each crank arm, a source of supply of fluid under pressure, a pipe line connecting both power cylinders, a valve for controlling the fluid under pressure from said source of supply to said pipe line and adapted to maintain fluid bottled up in the pipe line when the gate is in normal position, and means operated by variations in the head water level for controlling the operation of said valve.

3. In a dam, the combination of a rotatably mounted gate for maintaining the headwater at a predetermined level, a crank arm extending laterally from each end of the gate, a power cylinder at each end of the gate operatively connected to each crank arm, a source of supply of fluid under pressure, a pipe line extending across the dam and connecting both power cylinders, means for controlling the fluid under pressure from said source of supply to said pipe line, a float operated by the head water, means operatively connecting said float with said fluid pressure controlling means, and means connecting said fluid pressure controlling means with the means connecting a power cylinder with a crank arm.

4. In a dam, the combination of a rotatably mounted gate for maintaining the head water at a predetermined level, fluid pressure operated means adapted to maintain said gate in normal position, a float operated by the head water, a valve controlling the fluid pressure of said fluid pressure operated means, a floating lever operatively connected to said valve, means operatively connecting said float with said floating lever, and means connecting said fluid pressure operated means with said floating lever.

5. In a dam, a gate rotatably mounted on said dam and having a shield adapted to project upwardly above the top of the dam, a crank arm extending laterally from each end of the gate, a power cylinder at each end of the gate operatively connected to each crank arm to raise and lower the shield, a source of supply of fluid under pressure, a pipe line extending across the dam and beneath the gate and connecting both power cylinders, and means for controlling the fluid under pressure from said source of supply to said pipe line.

6. In a dam, the combination of a rotatably mounted gate for maintaining the head water at a predetermined level, fluid pressure operated means adapted to maintain said gate in normal position, and means operable by an increase of head water level above a predetermined height to relieve fluid pressure acting on said fluid pressure operated means to thereby permit the gate to move to a lower discharge position.

7. In a dam, a gate rotatably mounted on said dam and having a shield adapted to project upwardly to provide a head water pool of a desired level, a source of supply of fluid under pressure, fluid pressure operated means operatively connected to said gate and adapted to maintain said gate in its normal position, a valve controlling communication from said source of supply of fluid and said fluid pressure operated means, and means operated by an increase of head water for actuating said valve so as to relieve the fluid pressure acting on the gate operating means to thereby permit said gate to move to a discharge position.

8. In a dam, a gate urged to a discharge position by gravity, fluid pressure operated means operatively connected to said gate and adapted to maintain said gate in its normal position, and a valve operated by an abnormal increase of head water pressure to relieve the fluid pressure acting on said means to thereby permit the gate to move to a discharge position.

9. In a dam, a gate comprising a cylindrical portion rotatably mounted on said dam and a shield rigidly connected to the cylindrical portion and adapted to project upwardly above the top of the dam, an I-beam carried by said dam and disposed in juxtaposed parallel relationship with said gate, and a flexible member secured to said I-beam and coextensive with said gate and having a rubbing contact with said cylinder for sealing the joint between the dam and said gate.

10. In a dam, a gate, means for rotatably supporting said gate on said dam, an I-beam carried by said dam and disposed in juxtaposed parallel relationship with said gate, a flexible member secured to said I-beam and coextensive with said gate for sealing the joint between the dam and the gate, and means also carried by said I-beam and overlying said flexible member to protect the flexible member from debris and other foreign matter.

11. In a dam, the combination of a rotatably mounted gate for maintaining the head water at a predetermined level, fluid pressure operated means to maintain said gate in its normal position, a source of supply of fluid under pressure, a valve for controlling the fluid under pressure from said source to said fluid pressure operated means and adapted to maintain fluid bottled up in the fluid pressure operated means while the gate is in its normal position, means operated by an increase of head water to operate said valve to relieve the fluid pressure acting on said fluid pressure operated means to thereby permit the gate to move to a discharge position, a second control valve for controlling the fluid under pressure from said source to said fluid pressure operated means and adapted to normally maintain communication from the source of supply to said fluid pressure operated means, and means operated by an abnormal increase of head water pressure to actuate said second control valve to relieve the fluid pressure acting on said fluid pressure operated means to thereby permit the gate to move to a discharge position independent of operation of the first control valve.

12. A movable dam element comprising a cylinder, a plurality of bearings mounted in spaced relation on the crest of the dam for rotatably supporting said cylinder, and a continuous shield fastened to said cylinder and extending laterally therefrom, the intermediate bearings being open at the top to permit free movement of the shield from its uppermost to its lowermost position on the dam when the cylinder is rotated.

13. In a water gate for streams and the like, the combination with a flap gate opening in the direction of water flow and arranged to be opened when the height of the head water exceeds a predetermined amount, fluid pressure operated means to maintain said gate in its normal position, a control valve for controlling fluid under pressure supplied to said means, a float operable by variations in head water level for actuating said control valve, and compensating mechanism operated by said fluid pressure operated means to prevent the gate from over traveling.

14. In a water gate for streams and the like, the combination with a flap gate opening in the direction of water flow, fluid pressure operated means to maintain said gate in its normal position, a control valve for controlling fluid under pressure supplied to said means, means operable when the height of the head water exceeds a predetermined amount for actuating said control valve, a second control valve for controlling fluid under pressure supplied to said gate operating means, and means operable by an abnormal increase of head water pressure for actuating said second control valve independently of the first control valve to thereby permit the gate to move to a discharge position.

15. In a water gate for streams and the like, the combination with gate opening in the direction of water flow, means for maintaining said gate in its normal position, means operable by an increase in head water level for lowering the gate, and means operable independently of said head water level operated means and actuated by excessive head water pressure for lowering said gate.

VERL CHESTER SMITH.